April 14, 1925.
H. A. O. MÖLLER
1,533,445
CUTTER FOR CHEESE, BUTTER, AND THE LIKE
Filed Aug. 21, 1924
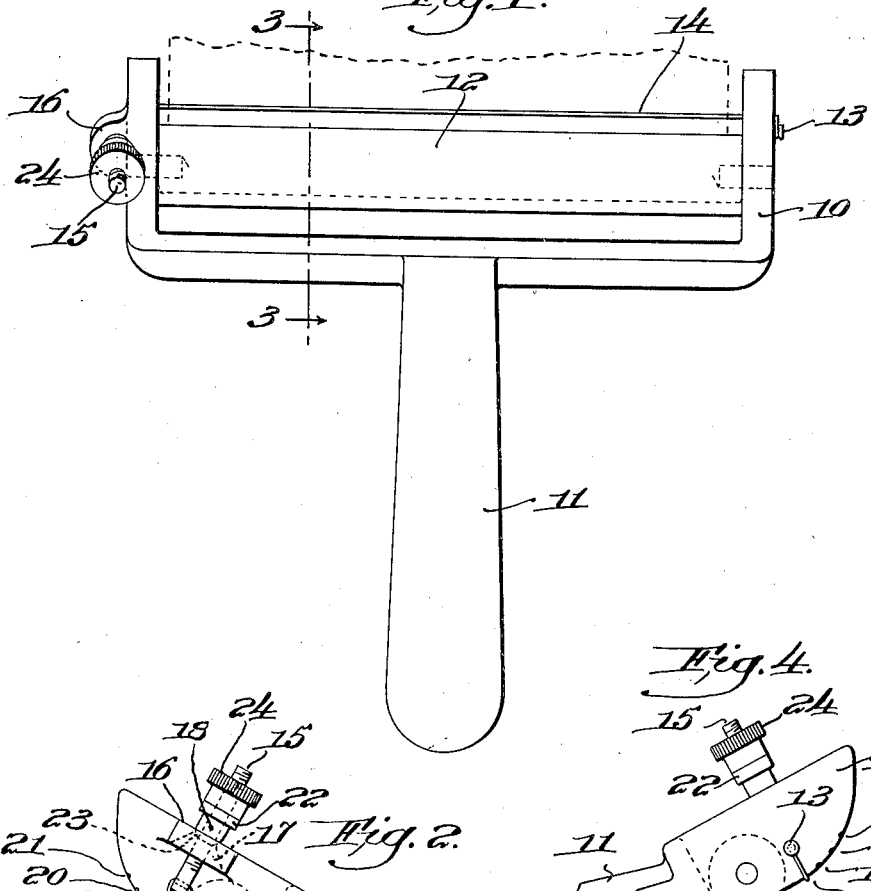
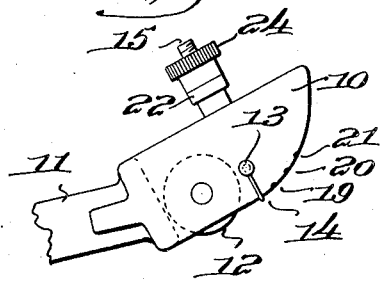
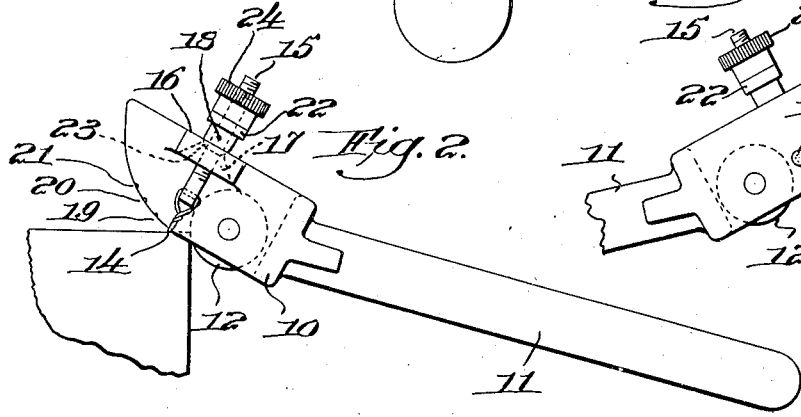
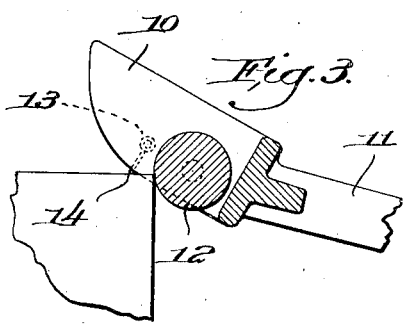

Patented Apr. 14, 1925.

1,533,445

UNITED STATES PATENT OFFICE.

HUGO ADOLF OTTO MÖLLER, OF BOSTON, MASSACHUSETTS, ASSIGNOR TO MAURICE M. SAUNDERS, OF BOSTON, MASSACHUSETTS.

CUTTER FOR CHEESE, BUTTER, AND THE LIKE.

Application filed August 21, 1924. Serial No. 733,262.

*To all whom it may concern:*

Be it known that I, HUGO A. O. MÖLLER, a citizen of the United States of America, and a resident of Boston, in the county of Suffolk and Commonwealth of Massachusetts, have invented certain new and useful Improvements in Cutters for Cheese, Butter, and the like, of which the following is a specification.

This invention relates to a cutter for cheese, butter and the like, and is particularly adapted for use in restaurants and lunch rooms where speed in service and uniformity in thickness of the material cut are desired.

It is an object of the invention to produce a cutter for the above use which is simple in structure, easily and rapidly manipulated, and which ensures a uniformity of thickness of the material cut.

It is a further object of the invention to produce a cutter of the above class which may be adjusted to cut material into slabs of different thicknesses.

A further object of the invention is to produce a cutter of this class which has a wire for the cutting medium which may be readily adjusted to the depth of cut required, and which may be readily replaced in case of breakage at but slight expense and loss of time.

Another object of the invention is to produce a cutter having a wire as a cutting medium and a material or work contact member that is revoluble, thereby providing an antifriction gauge member and guide.

The invention further consists in certain novel features of construction and arrangement of parts which will be fully understood from a description of the drawings and the claims hereinafter given.

Of the drawings:

Figure 1 represents a top plan view of the device.

Figure 2 is a side elevation looking toward the right of Figure 1.

Figure 3 is a section on the line 3—3 Figure 1.

Figure 4 is a partial side elevation looking toward the left of Figure 1.

Like characters represent like parts throughout the several figures of the drawings.

Referring to the drawings:

The drawings herewith illustrate one convenient form of the invention which might be used for slabbing or cutting cheese or butter, but it will be understood that it is not the intention to limit it to the precise construction and arrangement shown as the same might be changed without departing from its spirit and scope.

In the present instance the device has a yoke 10 and an extension or handle 11, the said yoke having journalled therein a roll 12, and at its right side, see Figures 1 and 4, is provided with a stud 13 to which is swingingly secured a wire 14 the other end of which is fast to a screw stud 15.

The screw stud 15 passes through an ear 16 which is provided with a hole 17, see Figure 2, so arranged as to permit the said stud 15 to swing on an imaginary pivot located approximately at 18, when the wire 14 is to be adjusted to one or the other of the pairs of notches 19, 20, and 21 for different depths of cut.

Loosely surrounding the stud 15 is a bored sleeve 22, having a spherical lower end 23 adapted to rest in a socket forming part of the hole 17, and a nut 24.

To adjust the wire 14 to give a greater depth of cut than shown in the drawings, the nut 24 will be turned to release the tension on wire 14 so that it can be moved to engage the pair of notches desired, and thereafter the nut will again be turned to draw the said wire taut.

While the present device was designed to cut cheese and butter, it will be understood that it might be used equally well in cutting fruits and vegetables, or any plastic, semiplastic, or soft materials difficult or impossible to cut with a knife blade.

Having described the invention I claim:

1. A cutter of the class described comprising a yoke and attached handle, the limbs of said yoke having their under sides rocker shaped at the ends thereof, and provided with means to retain a cutting wire in one of a plurality of predetermined positions; a cutting wire mounted on said yoke and normally held thereon under tension; means to exert tension on said wire; means to change the position of said tension exerting means whereby said cutting wire may be made to register with one of a plurality of positions predetermined by said wire retaining means; and a work contact device arranged to guide said wire during the cutting operation.

2. A cutter of the class described, comprising a yoke and attached handle, a cutting wire mounted on said yoke and normally held thereon under tension; means to exert tension on said wire, said means including a screw stud arranged to have its axial angularity changed whereby said wire may be shifted for different depths of cut; a nut coacting with said stud; and a work contact device arranged to guide said wire during the cutting operation.

3. A cutter of the class described, comprising a yoke and attached handle, a cutting wire mounted on said yoke and normally held thereon under tension; the limbs of said yoke having a plurality of notches therein arranged to receive said wire; a screw stud and a nut arranged to apply tension to said wire and to be shifted when said wire is shifted from one set of notches to another for the purpose of adjusting it for different depths of cut; and a work contact member arranged to guide said wire during the cutting operation.

4. A cutter of the class described, comprising a yoke and attached handle; a work contact member; a cutting wire mounted on said yoke and arranged to be moved in parallelism with said work contact member whereby the depth of cut may be changed; and means to exert tension on said wire, said means including a screw stud arranged to be swung about a pivot point located intermediate its ends.

5. A cutter of the class described, comprising a frame, a cutting wire having one of its ends secured to and arranged to swing about a stud on said frame, and its other end secured to a screw stud, said stud being mounted in such manner as to have its axial angularity changed when said wire is shifted to regulate depth of cut; a nut coacting with said screw stud; said frame having means thereon whereby said wire may be shifted to different portions of said frame for the purpose of regulating the depth of cut, and held there by the combined action of said means and said screw stud and said nut; and work contact means arranged to guide said wire during the cutting operation.

Signed by me at Boston, Mass. this 19 day of August 1924.

HUGO ADOLF OTTO MÖLLER.